United States Patent
Batiz

(10) Patent No.: US 10,931,553 B1
(45) Date of Patent: Feb. 23, 2021

(54) EVALUATING NETWORK SPEED BY MULTIPLE PARALLEL DATA EXCHANGES BETWEEN A CLIENT DEVICE AND MULTIPLE SERVERS VIA THE NETWORK

(71) Applicant: CASE ON IT, S.L., Madrid (ES)

(72) Inventor: Agustin Batiz, Madrid (ES)

(73) Assignee: CASE ON IT, S.L., Madrid (ES)

( * ) Notice: Subject to any disclaimer, the term of this patent is extended or adjusted under 35 U.S.C. 154(b) by 71 days.

(21) Appl. No.: 16/380,799

(22) Filed: Apr. 10, 2019

(51) Int. Cl.
*H04L 12/26* (2006.01)

(52) U.S. Cl.
CPC .................. *H04L 43/0876* (2013.01)

(58) Field of Classification Search
CPC .................................................. H04L 43/0876
USPC ............................................. 370/252
See application file for complete search history.

(56) References Cited

U.S. PATENT DOCUMENTS

| | | | | |
|---|---|---|---|---|
| 2004/0139024 A1* | 7/2004 | So | ........................ | H04L 63/0428 705/51 |
| 2012/0198020 A1* | 8/2012 | Parker | .................... | H04W 12/08 709/217 |
| 2014/0188974 A1* | 7/2014 | Ioannidis | ............ | H04L 67/2842 709/202 |
| 2014/0237081 A1* | 8/2014 | Zhu | ........................ | H04L 65/601 709/219 |

* cited by examiner

*Primary Examiner* — Chi Tang P Cheng
(74) *Attorney, Agent, or Firm* — Fenwick & West LLP

(57) ABSTRACT

A client device is connected to a network via one or more communication channels and exchanges content with one or more content provider systems via the network and the communication channels. To evaluate performance of the network or communication channels, the client device requests content from each of multiple content provider systems via the network. The client device determines one or more metrics, such as download data rate or upload data rate, for receiving or for transmitting content from each of the different content provider systems during a time interval. Based on metrics determined for content from multiple content provider systems, the client device determines one or more network performance metrics. Different types of content may be requested from different content provider systems in some embodiments.

16 Claims, 3 Drawing Sheets

EVALUATING NETWORK SPEED BY MULTIPLE PARALLEL DATA EXCHANGES BETWEEN A CLIENT DEVICE AND MULTIPLE SERVERS VIA THE NETWORK

BACKGROUND

This invention relates generally to determining performance of a network, and more particularly to evaluating network performance from parallel exchanges of data between the client device and multiple content provider systems via the network.

Various content provider systems provide an increasing amount of content to client devices for presentation to users via one or more networks. Client devices are coupled to a network via one or more communication channels to obtain content provided by various content provider systems. For example, a content provider system coupled to a network provides audio or video data to client devices that are coupled to the network via one or more communication channels, allowing users of the client devices to access the audio or video data.

To evaluate a network or one or more communication channels coupling a client device to a network, a client device requests content from a specific server and monitors receipt of the requested content from the server during a time interval. For example, the client device exchanges one or more sample binary files with the server and monitoring a time for the client device to receive different binary files from the server. In conventional configurations, a client device identifies a single server from which content is requested. For example, an application executing on the client device is associated with a set of servers that are each in different physical locations and requests content from a specific sever of the set that is closest to a physical location of the client device.

However, exchanging content with a single server via a network and a communication channel can result in inaccurate evaluation of the network and the communication channel. For example, multiple client devices requesting or exchanging content with the same server increases congestion at the server, delaying transmission of content from the server via the network and communication channel. While the delay in the preceding example is not caused by the network or by the communication channel, but by the number of requests for content received by the server, the client device accounts for the server-caused delay when evaluating the network or the communication channel. This causes the client device to inaccurately evaluate the network or communication channel as providing worse performance than caused by network or communication channel configuration or operation. Hence, conventional methods of evaluating network or communication channel performance based on exchanging content with a single server may provide inaccurate information describing network bandwidth or latency.

SUMMARY

A client device is connected to a network via one or more communication channels and exchanges content with one or more content provider systems via the network and the communication channels. To evaluate performance of the network or the communication channels, the client device requests content from each of multiple content provider systems via the network and a communication channel. The client device determines one or more metrics, such as download data rate, upload data rate, and one or more latency measurements for receiving content from or transmitting content to each of the different content provider systems. From metrics determined from exchanging content with multiple content delivery systems, the client device determines one or more network metrics. For example, the client device determines data rates for exchanging content with each of multiple content delivery systems during multiple time intervals and generates a network, or a communication channel, data rate from the data rates for each of the content delivery systems during different time intervals. In one embodiment, the client device sums data rates generated from exchanging content with each of multiple content provider systems during different time intervals and applies a percentile function to the summed data rates to generate a network data rate as a summed data rate below which a specific percentage of the summed data rates fall.

The client device may receive different content from different content provider systems in various embodiments, allowing the one or more metrics determined by the client device to more accurately represent exchange of content between the client device and different content provider systems. Additionally, the client device may request content from at least one content provider system having a specific geographic location in some embodiments. Further, the client device may determine latency measurements for communicating with each content provider system while exchanging content with the content provider systems and correlates latency measurements with network metrics generated at time intervals including times during which the latency measurements were determined. For example, the client device pings a content provider system at multiple times during which the client device exchanges content with the content provider system, generating multiple latency measurements for communicating with the content provider system while exchanging content with the content provider system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
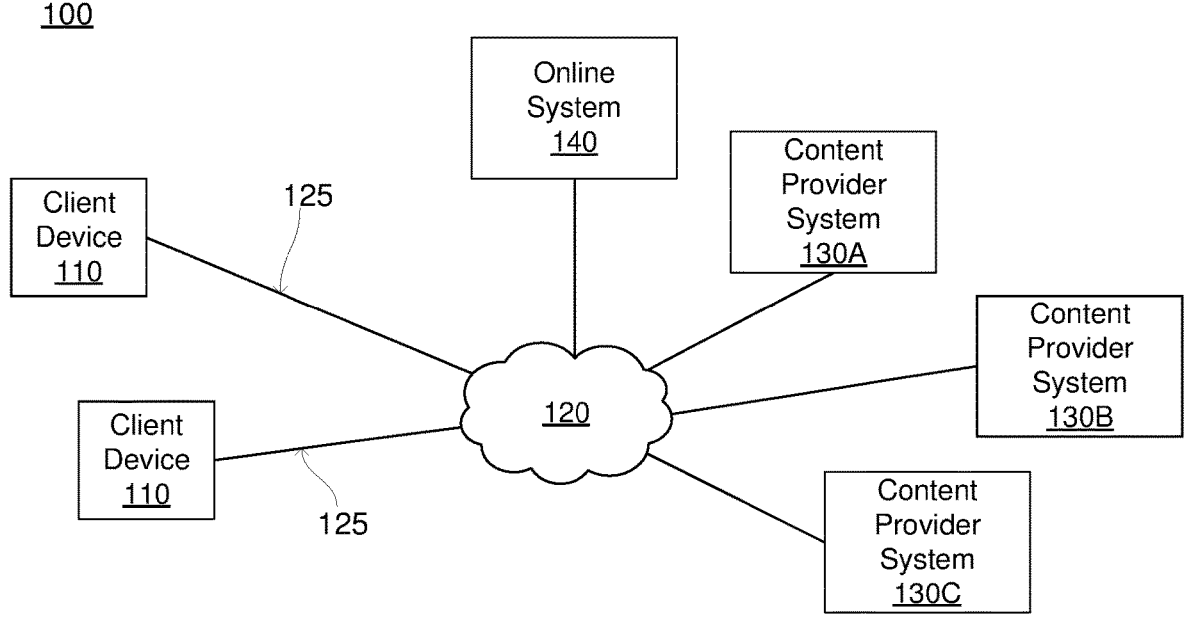
FIG. 1 is a block diagram of a system environment in which a client device generates one or more metrics describing content exchange via a network and a communication channel, in accordance with an embodiment of the invention.

FIG. 1 is a block diagram of a system environment 100 in which an client device 110 operates. The system environment 100 shown by FIG. 1 comprises one or more client devices 110, a network 120, one or more content provider systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with one or more third party systems 130 or other sources of content. For example, a client device 110 executes a browser application to enable interaction between the client device 110 and a content provider system 130 via the network 120. In another embodiment, a client device 110 interacts with a content provider system 130 through an application programming interface (API) running on a native operating system of the client device 110, such as IOS® or ANDROID™.

The client devices 110 are configured to communicate via the network 120 through one or more communication channels 125 that couple client devices 110 to the network 120, which may comprise any combination of local area and/or wide area networks, using both wired and/or wireless communication systems. In one embodiment, the network 120 uses standard communications technologies and/or protocols. For example, the network 120 includes communication channels 125 using technologies such as Ethernet, 802.11, worldwide interoperability for microwave access (WiMAX), 3G, 4G, code division multiple access (CDMA), digital subscriber line (DSL), etc. In some embodiments, the network 120 includes a single type of communication channel 125, while in other embodiments the network 120 includes multiple types of communication channels 125. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication channels 125 of the network 120 may be encrypted using any suitable technique or techniques.

One or more systems may maintain and configure the network 120 by specifying or modifying various technical characteristics used by the network 120 to communicate content between client devices 110 and content provider systems 130, between client devices 110, or between content provider systems 130. For example, a system determines placement of antennas or access points used by client devices 110 to connect to the network 120 to provide a coverage radius of the network or affect a signal strength of a connection to the network for various client devices 110. As another example, a system specifies the communication channels 125 used by the network 120 and client devices 110 to exchange information and configures characteristics of the communication channels 125.

A client device 110 generates one or more metrics describing exchange of content between the client device 110 and one or more content provider systems 130A, 130B, 130C in various embodiments. For example, the client device 110 determines a download data rate at which the client device 110 receives content from multiple content provider systems 130A, 130B, 130C via the network 120 and a communication channel 125. As another example, the client device 110 determines an upload data rate at which the client device 110 transmits content to each of multiple content provider systems 130A, 130B, 130C. In other examples, the client device 110 determines a latency metric corresponding to transmission of content to various content provider systems 130A, 130B, 130C or receipt of content from various content provider systems 130A, 130B, 130C. The generated metrics allow a user of the client device 110 or one or more applications executing on the client device 110 to notify a system configuring the network 120 or the communication channel 125 of problems in the network 120 or communication channel 125 exchange of content, allowing the system to modify one or more characteristics of the network or in the communication channel 125. As further described below in conjunction with FIG. 3, when generating the one or more metrics describing exchange of content between the client device 110 and the one or more content provider systems 130A, 130B, 130C, the client device 110 exchanges content with multiple content provider systems 130A, 130B, 130C via the network 120 and the communication channel 125, improving the accuracy of the one or more generated metrics in describing the network 120 or the communication channel 125 performance.

In various embodiments, the client device 110 generates an interface presenting one or more generated metrics describing the network 120 or the communication channel 125 performance to a user of the client device 110. The interface may update the generated metrics during a time interval when the client device 110 is generating the metrics, allowing the user to view changes in the metrics while the client device 110 generates the metrics. Alternatively, the interface withholds presentation to a user of the client device 110 until the client device 110 generates the one or more metrics. For example, the interface presenting values for the one or more generated metrics is a portion of an application executing on the client device 110, such as an application that received an interaction from the user of the client device 110 to generate the one or more metrics and that subsequently generated the one or more metrics. The user of the client device 110 may select which generated metrics are presented via the interface in some embodiments. Hence, a user of the client device 110 may initiate generation of the one or more metrics describing exchange of content between the client device 110 and one or more content provider systems 130A, 130B, 130C by providing an input or instruction to an application executing on the client device 110, and the application may also present the generated one or more metrics to the user of the client device 110.

One or more content provider systems 130A, 130B, 130C (also referred to individually and collectively using reference number 130) may be coupled to the network 120 and transmit content to a client device 110 via the network 120 and a communication channel 125. A content provider system 130 may transmit content to the client device 110 via the network 120 and the communication channel 125 or may receive content from the client device 110 via the network 120 and the communication channel 125. A content provider system 130 may transmit one or more types of content to the client device 110 or may receive one or more types of content from the client device 110. Example types of content include: video, image, text, and any suitable combination thereof. In some embodiments, different content provider systems 130 transmit different types of content, or different content provider systems 130 receive different types of content. A content provider system 130 may be one or more servers maintaining or obtaining content that is transmitted to the client device 110 via the network 120 and the communication channel 125 or storing content received from the client device 110 via the network 120 and the communication channel 125. Different content provider systems 130 may have different physical locations. For example, different content provider systems 130 are in different cities, different countries, different states, or other different geographic locations.

In some embodiments, the online system 140 receives metrics describing exchange of content between the client device 110 and various content provider systems 130A, 130B, 130C and stores the received metrics in association with an identifier of the client device 110, as well as with identifiers of the network 120 and the communication channel 125 through which the client device 110 exchanged data. The online system 140 may be associated with an application executing on the client device 110 that exchanges content between the client device 110 and multiple content provider systems 130A, 130B, 130C to generate the one or more metrics. The application executing on the client device 110 transmits the generated metrics to the online system 140 along with an identifier of the client device 110, an identifier of the network 120, and an identifier of the communication channel 125 used to exchange content. In some embodiments, the online system 140 includes network addresses (or other identifying information) for different content provider systems 130A, 130B, 130C with which the client device 110 exchanges content, so the application executing on the client device 110 obtains network addresses for multiple content provider systems 130A, 130B, 130C from the online system 140 and subsequently exchanges content with each of the content provider systems 130A, 130B, 130C via the network 120 and the communication channel 125 using the obtained network addresses. Alternatively, the application associated with the online system 140 and executing on the client device 110 includes network addresses or other identifying information for multiple content provider systems 130A, 130B, 130C, so the application exchanges content with the multiple content provider systems 130A, 130B, 130C in response to receiving an input from a user or a request from the online system 140.

The online system 140 may analyze or aggregate metrics received from multiple client devices 110 that are associated with a common identifier of a network 120, with a common identifier of a communication channel 125, or with both a common identifier of a network 120 and a common identifier of a communication channel 125. The online system 140 may maintain a record of metrics generated for a network 120 a for a communication channel 125 by different client devices 110 at different times to assess performance of the network or the communication channel 125 over time. Additionally or alternatively, the online system 140 combines metrics generated by different client devices 110 for the network 120 or for a communication channel 125 at a common time to generate a specific metric for the network 120 or for the communication channel 125 at the common time (e.g., determines a mean, a median, or a mode of a metric generated by different client devices 110 at the common time).

Figure 2:
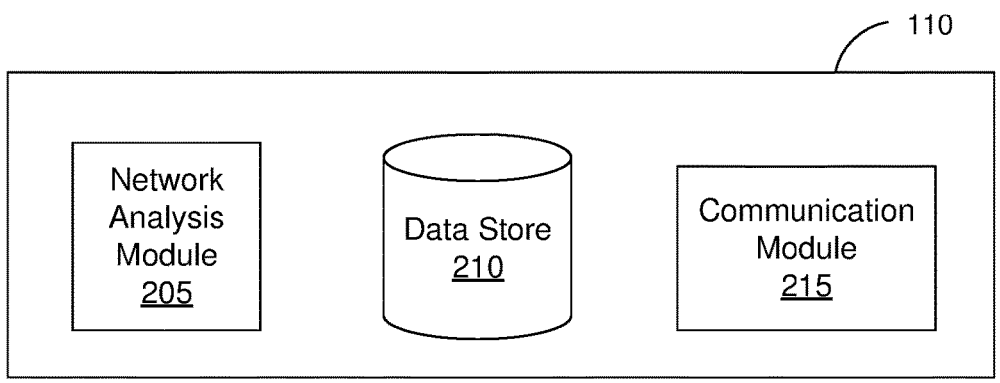
FIG. 2 is a block diagram of a client device generating one or more metrics for content exchange via a network and a communication channel, in accordance with an embodiment of the invention.

FIG. 2 is a block diagram of an architecture of a client device 110. The client device 110 shown in FIG. 2 includes a network analysis module 205, a data store 210, and a communication module 215. In other embodiments, the client device 110 may include additional, fewer, or different components for various applications. For example, in various embodiments, the client device 110 includes one or more input devices and a display device, and may also include one or more of an audio capture device, a speaker, and an image capture device.

The network analysis module 205 generates one or more metrics describing exchange of content between the client device 110 and one or more content provider systems 130A, 130B, 130C via a network 120 and a communication channel 125. The network analysis module 205 transmits requests for content to one or more content provider systems 130A, 130B, 130C via a network 120 and a communication channel 125, as further described below in conjunction with FIG. 3. The network analysis module 205 subsequently receives content from each of the content provider systems 130A, 130B, 130C from which content was requested and generates one or more metrics describing receipt of content via the network 120 and the communication channel 125 by monitoring receipt of content from each of the content provider systems 130A, 130B, 130C. For example, the network analysis module 205 generates download data rates for content received from different content provider systems 130A, 130B, 130C during different time intervals. From the download data rates generated for each content provider system 130A, 130C, 130C during different time intervals, the network analysis module 205 generates a network download data rate describing a rate at which the client device 110 receives content via the network 120 and the communication channel 125, as further described below in conjunction with FIG. 3.

Similarly, the network analysis module 205 may transmit content from the client device 110 to different content provider systems 130A, 130B, 130C via the network 120 and the communication channel 125. The network analysis module 205 monitors transmission of content to different content provider systems 130A, 130B, 130C to each of the content provider systems 130A, 130B, 130C and generates upload data rates for content transmitted to different content provider systems 130A, 130B, 130C at different time intervals. From the upload data rates generated for each content provider system 130A, 130B, 130C during different time intervals, the network analysis module 205 generates a network upload data rate describing a rate at which the client device 110 transmits content via the network 120 and the communication channel 125, as further described below in conjunction with FIG. 3. The network analysis module 205 may also perform latency measurements on the network 120 and the communication channel 125 when transmitting or when receiving content via the network 120 and the communication channel 125 and correlate latency measurements with network download data rates or network upload data rates corresponding to times when the latency measurements were made. The network analysis module 205 may also analyze latency measurements for receipt of content from different content provider systems 130A, 130B, 130C or for transmission of content to different content provider systems 130A, 130B, 130C to generate a network latency metric, as further described below in conjunction with FIG. 3.

In some embodiments, the data store 210 stores metrics generated by the network analysis module 205 at different times. For example, the data store 210 stores an identifier of a network 120 and an identifier of a communication channel 125 through which the client device 110 exchanged content with one or more content provider systems 130A, 130B, 130C in association with one or more metrics generated by the network analysis module 205 based on the exchanged content. The data store 210 may also store a time when the one or more metrics were generated by the network analysis module 205 to provide a record of metrics generated for exchange of content with one or more content provider systems 130A, 130B, 130C at different times.

Additionally, the data store 210 may include network addresses or other identifiers of content provider systems 130A, 130B, 130C with which the network analysis module 205 exchanges content, so the network analysis module 205 retrieves network addresses of multiple content provider systems 130A, 130B, 130C in response to receiving an input, and requests content from each of the multiple content provider systems 130A, 130B, 130C or transmits content to each of the multiple content provider systems 130A, 130B, 130C. The data store 210 may also include instructions for identifying content provider systems 130A, 130B, 130C with which the network analysis module 205 exchanges data. For example, the data store 210 includes instructions specifying a maximum geographic distance between a geographic location of the client device 110 and geographic locations of content provider systems 130A, 130B, 130C with which the network analysis module 205 exchanges content. In one embodiment, the data store 210 includes geographic locations corresponding to each content provider system 130A, 130B, 130C, and the network analysis module 205 selects network addresses of content provider systems 130A, 130B, 130C having corresponding geographic locations less than the maximum geographic distance from a geographic location of the client device 110 with which to exchange data. The data store 210 may also include an instruction specifying the network analysis module 205 exchange content with a specific content provider server 130A, 130B, 130C having a specific geographic location, regardless of the distance between a geographic location of the client device 110 and the specific content provider server 130A, 130B, 130C. For example, the data store 210 includes an instruction specifying the network analysis module 205 transmit content to or receive data from a specific content provider server 130A, 130B, 130C having a geographic location within the United States or within another specified geographic region.

The communication module 215 couples the client device 110 to a communication channel 125, which is coupled to the network 120. The communication module 215 receives content from the online system 140 or from one or more content provider systems 130A, 130B, 130C via the network 120 and the communication channel 215. Similarly, the communication module 215 transmits content from the client device 110 to the online system 140 or to one or more content provider systems 130A, 130B, 130C via the network 120 and the communication channel 125. The communication module 215 enables transmission and receipt of content or other data via any suitable communication channel 125 (e.g., Ethernet, 802.11, WiMAX, 3G, 4G, 5G, CDMA, etc.) or combination of communication channels 125. Any suitable networking protocol or combination of networking protocols (e.g., MPLS, TCP/IP, HTTP, SMTP, FTP, etc.) may be used by the communication module 215 to transmit and to receive data or content via the network 120 and the communication channel 125. Data transmitted or received by the communication module 215 may be represented using any suitable format, such as HTML or XML, in various embodiments.

Figure 3:
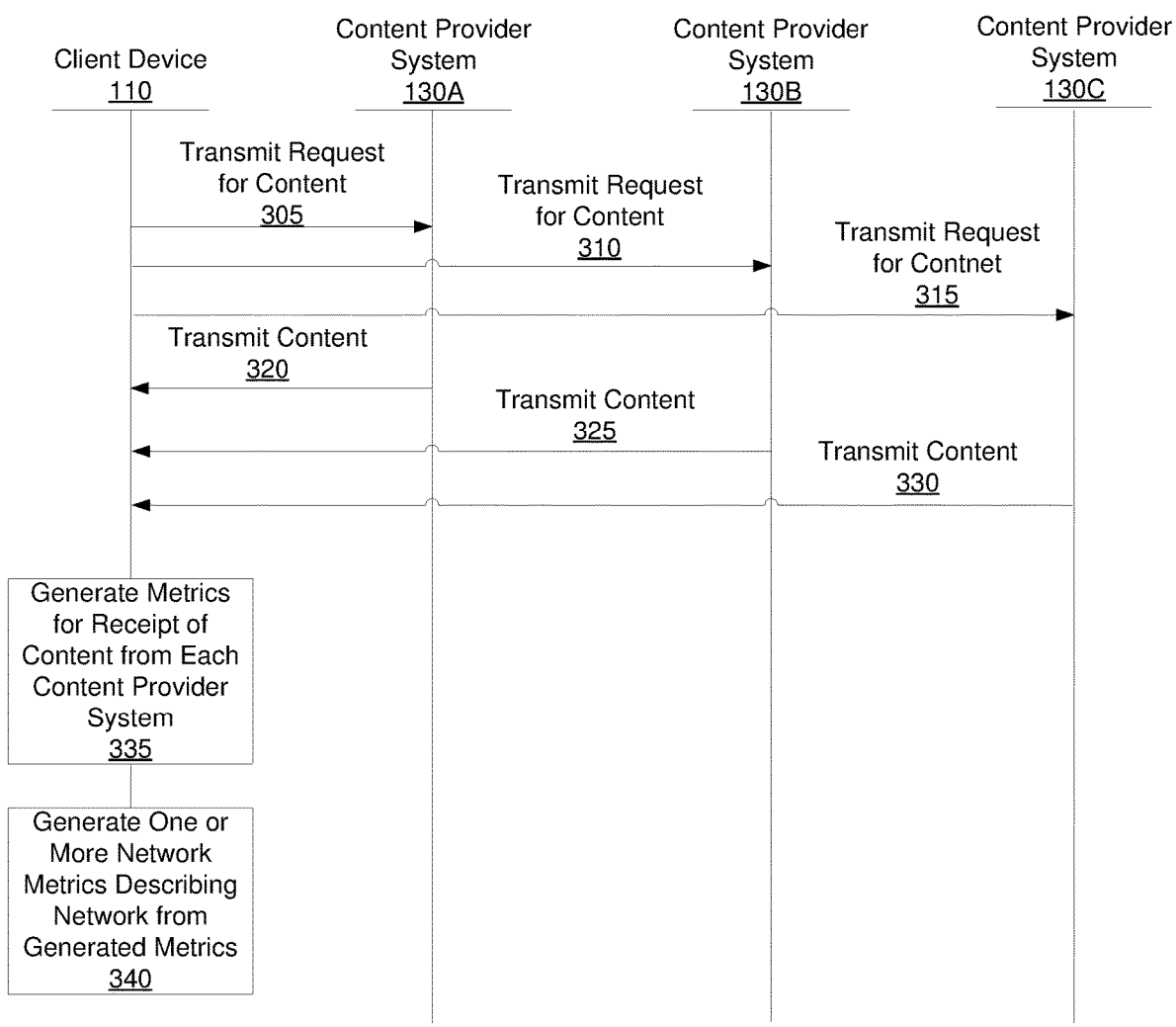
FIG. 3 is an interaction diagram of a method for generating one or more metrics describing a network to which a client device is coupled, in accordance with an embodiment of the invention.

Evaluating Network Performance by Exchanging Content with Multiple Content Provider Systems FIG. 3 is an event diagram of one embodiment of a method for generating one or more metrics describing communication of content via a network 120 to which a client device 110 is coupled by exchanging content between the client device 110 and multiple content provider systems 130. In various embodiments, the method may include different or additional steps than those described in conjunction with FIG. 3. Additionally, in some embodiments, steps of the method may be performed in different orders than the order described in conjunction with FIG. 3.

As described above in conjunction with FIG. 1, a client device 110 is coupled to a network 120 via a communication channel 125. Using the network 120 and the communication channel 125 the client device 110 exchanges content with one or more other client devices 110 or with one or more content provider systems 130. For example, the client device 110 transmits a request for content to a content provider system 130 via the communication channel 125 and the network 120. Subsequently, the client device 110 receives the requested content from the content provider system 130 via the network 120 and the communication channel 125. As another example, the client device 110 transmits content (e.g., binary files including one or more of image data, text data, and video data) to a content provider system 130 via the communication channel 125 and the network 120.

One or more parameters of the communication channel 125 and the network 120 affect transmission of content between the client device 110 and a content provider system 130 or other client devices 110. For example, a bandwidth of the network 120 or of the communication channel 125 affects an amount of time for the client device 110 to receive content from a content provider system 130 or from another client device 110 (i.e., a "download speed"). As another example, the bandwidth of the network 120 or of the communication channel 125 affects amount of time for the client device 110 to transmit content to a content provider system 130 or to another client device 110 (i.e., an "upload speed"). In another example, a latency of the network 120 or of the communication channel 125 affects an amount of time for the client device 110 to transmit data via the network 120 or the communication channel 125. However, other parameters of the network 120 or of the communication channel 125 affect exchange of content or other data between the client device 110 and other client devices 110 or with content delivery systems 130.

To determine one or more parameters of the network 120 or of the communication channel 125, the client device 110 transmits a request for content to multiple content provider systems 130 via the communication channel 125 and the network 120. In the example shown by FIG. 3, the client device 110 transmits 305 a request for content to content provider system 130A, transmits 310 another request for content to content provider system 130B, and transmits 315 an additional request for content to content provider system 130C. Each of the requests for content are transmitted 305, 310, 315 by the client device 110 via the network 120 and the communication channel 125. Hence, the client device 110 transmits request for content to multiple content provider systems 130A, 130B, 130C in parallel. Network addresses of various content provider systems 130A, 130B, 130C may be stored by the client device 110 to identify destinations for the requests for content. For example, an application executing on the client device 110 transmits 305, 310, 315 the requests to the content provider systems 130A, 130B, 130C, and the application includes network addresses or other identifying information for each of the content provider systems 130A, 130B, 130C. Alternatively, the client device 110 obtains network addresses for various content provider systems 130A, 130B, 130C from an online system 140 coupled to the client device 110 via the network 120 and the communication channel 125. For example, an application executing on the client device 110 retrieves network addresses for multiple content provider systems 130A, 130B, 130C from an online system 140 associated with the application. Subsequently, the client device 110 transmits 305, 310, 315 the requests for content to the content provider systems 130A, 130B, 130C for which network addresses were received from the online system 140.

In some embodiments, requests for content transmitted 305, 310, 315 to different content provider systems 130A, 130B, 130C request different content. For example, different requests for content request different types of content from different content provider systems 130A, 130B, 130C. As an example, the client device 110 transmits 305 a request for text content to content provider system 130A, transmits 310 a request for video content to content provider system 130B, and transmits 315 a request for image content to content provider system 130C. In various embodiments, the client device 110 includes information associating different types of content with identifies (e.g., network addresses) of different content provider systems 130, and transmits a request to a content provider system 130 for a type of content associated with an identifier of the content provider system 130.

After receiving the requests for content from the client device 110, the different content provider systems 130A, 130B, 130C transmit 320, 325, 330 the requested content to the client device 110 via the network 120 and the communication channel 125. In the example shown by FIG. 3, content provider system 130A transmits 320 requested content to the client device 110 via the network 120 and the communication channel 125, while content provider system 130B transmits 325 requested content to the client device 110 via the network 120 and the communication channel 125. Similarly, content provider system 130C transmits 330 requested content to the client device 110 via the network 120 and the communication channel 125. Therefore, the client device 110 receives content from different content provider systems 130A, 130B, 130C via different threads established through the communication channel 125 and the network 120. In various embodiments, the client device 110 establishes different threads via the communication channel 125 and the network 120 with different content provider systems 130A, 130B, 130C.

The client device 110 monitors receipt of content from different content provider systems 130A, 130B, 130C via the network 120 and the communication channel 125 and generates 335 a metric describing receipt of content form different content provider systems 130A, 130B, 130C. In the example of FIG. 3, the client device 110 generates 335 a metric describing receipt of content by the client device 110 from content provider system 130A, another metric describing receipt of content by the client device 110 from content provider system 130B, and an additional metric describing receipt of content by the client device 110 from content provider system 130B. For example, the client device 110 generates 335 a metric describing a download data rate at which content is received from each of the content provider systems 130A, 130B, 130C during a time interval. As an example, the client device 110 determines a number of bits of content received from content provider system 130A during a time interval, determines a number of bits of content received from content provider system 130B received during the time interval, and determines a number of bits of content received from content provider system 130C received during the time interval. From the determined number of bits of content received from each of the content provider systems 130A, 130B, 130C, the client device 110 generates 335 a download data rate for content received from content provider system 130A during the time interval, another download data rate for content received from content provider system 130B during the time interval, and an additional download data rate for content received from content provider system 130C during the time interval. Hence, the client device 110 determines metrics that each describing receipt of content from a different content provider system 130A, 130B, 130C during the time interval.

From metrics describing receipt of content from different content provider systems 130A, 130B, 130C, the client device 110 generates 340 one or more network metrics that describe characteristics of the network 120 or the communication channel 125 from which the client device 110 received content from the content provider systems 130A, 130B, 130C. The client device 110 may discard a certain portion of the generated metrics describing receipt of content from the content provider systems 130A, 130B, 130C in some embodiments. For example, the client device 110 modifies metrics generated 335 for receipt of data from content provider systems 130A, 130B, 130C by removing metrics generated during a specific time interval after content was requested from the content provider systems 130A, 130B, 130C, so the modified metrics remove metrics corresponding to a time interval when congestion control methods are applied to communication via the network 120 and the communication channel 125, as such information is not related to performance or capacity of the network 120 or of the communication channel 125. In some embodiments, the client device 110 generates 340 a network metric that is a mean of metrics generated 335 describing receipt of content from each of the content provider systems 130A, 130B, 130C. For example, the client device 110 generates 335 multiple download data rates that each correspond to receipt of content from different content provider systems 130A, 130B, 130C, and generates 340 a network download data rate as a mean of the multiple download data rates. In other embodiments, the client device 110 generates 340 a network metric as a median or a mode of metrics generated 335 for content received from different content provider systems 130A, 130B, 130C. However, the client device 340 may generate 340 a network metric based on any suitable analysis of metrics generated 335 from receipt of content from different content provider systems 130A, 130B, 130C.

In one embodiment, the client device 110 generates 340 a network metric by summing download data rates generated 335 from receipt of content from each of the content provider systems 130A, 130B, 130C during different time intervals and applying a percentile function to the summed download data rates for content received from each content provider system 130A, 130B, 130C to generate 340 a download data rate for the network 120 or for the communication channel 125. For example, the client device 110 generates 340 the network metric by applying the following function to sums of download data rates generated 335 for each content provider system 130 at different time intervals:

$$V_F = C_{min} + \frac{C_{max} - C_{min}}{\sqrt{N}} \cdot \frac{k \cdot \frac{N}{100} \cdot \sum_{j=1}^{m} \frac{n_{ij}}{\sum_{i=1}^{n} n_{ij}}}{\frac{n_i}{\sum_{i=1}^{n} n_i}} \quad (1)$$

In equation 1 above, N denotes a total number of content provider systems 130 from which the client device 110 receives content, while k denotes a specific percentile. Further, in equation (1) above, $n_i$ denotes the $i^{th}$ content provider system 130 from which the client device 110 receives content (e.g., $n_1$ denotes content provider system 130A in the example of FIG. 3). Hence, the client device 110 determines download data rates for content received from each content provider system 130A, 130B, 130C over different time intervals (i.e., determines a ratio of a number of bits received by the client device 110 from a content provider system 130 to a duration of a time interval) and, for each content provider system 130A, 130B, 130C sums the download data rates determined for different time intervals, resulting in a summed download data rate for each content provider system 130A, 130B, 130C. In equation (1) above, $C_{max}$ denotes a maximum summed download data rate for the content provider systems 130A, 130B, 130C, while $C_{min}$ denotes a minimum summed download data rate for the content provider systems 130A, 130B, 130C. Hence, $C_{max}$ is a maximum value of summed download data rates over different time intervals of all time intervals during which the client device 110 generates 340 the network metric, while $C_{min}$ is a maximum value of summed download data rates over different time intervals of all time intervals during which the client device 110 generates 340 the network metric. Subsequently, the client device 110 applies equation 1 above to the summed download data rates for each of the content provider systems 130A, 130B, 130C to determine a network download data rate as a summed download data rate within a specific percentile of the summed download data rates.

In various embodiments, in addition to determining a network download data rate from download data rates for content received from multiple content provider systems 130A, 130B, 130C, the client device 110 also determines a network latency from latencies determines for content received from each content provider system 130A, 130B, 130C. To determine network latency, the client device 110 transmits echo requests (i.e., pings) to each content provider system 130A, 130B, 130C from which content is received, while the client device 110 is receiving content from different content provider systems 130A, 130B, 130C, determining a length of time for different content provider systems 130A, 130B, 130C to return the requests as a latency for communication between the client device 110 and each content provider system 130A, 130B, 130C via the network 120 and the communication channel 125. For example, while the client device 110 is receiving content from content provider system 130A, the client device 110 transmits ping requests to content provider system 130A via the network 120 and the communication channel 125 at periodic intervals; similarly, the client device 110 transmits ping requests to content provider system 130B via the network 120 and the communication channel 125 at periodic intervals while the client device 110 receives content from content provider system 130B. Information received from content provider systems 130A, 130B, 130C to which ping requests were transmitted provides the client device 110 with multiple latency measurements for each of the multiple content provider systems 130A, 130B, 130C from which the client device 110 received content. The client device 110 determines a network latency metric for the network 120 and the communication channel 125 from the multiple latency measurements for each of the multiple content provider systems 130A, 130B, 130C. For example, the client device 110 determines the network latency metric for the network 120 and the communication channel 125 as the mean, the median, or the mode of the multiple latency measurements. In another embodiment, the client device 110 determines the network latency metric for the network 120 and the communication channel 125 as a network latency measurement as a network latency measurement for a content provider system 130A, 130B, 130C in a specific percentile of the network latency measurements for the multiple content provider systems 130A, 130B, 130C. However, in other embodiments, the client device 110 determines the network latency metric for the network 120 and the communication channel 125 using any suitable measurement.

By using multiple latency measurements determined for each of multiple content provider systems 130A, 130B, 130C from which the client device 110 received content, the client device 110 more accurately determines the latency of the network 120 and the communication channel 125 than in conventional implementations where the client device 110 transmits a single ping request to a content provider system 130A, 130B, 130C when content is initially requested from the content provider system 130A 130B, 130C. Additionally, the client device 110 may correlate latency measurements for a content provider system 130A, 130B, 130C at multiple times with download data rates determined for content received from the content provider system 130A, 130B, 130C within a threshold amount of time of a time when a ping request was transmitted to the client device 110. For example, the client device 110 stores an association between a latency measurement for a content provider system 130A from an echo request transmitted to the content provider system 130A at a first time when a download data rate was determined for content received from the content provider system 130A during a time interval including the first time and stores another association between a second latency measurement for a content provider system 130A from a second echo request transmitted to the content provider system 130A at a second time when a second download data rate was determined for content received from the content provider system 130A during a time interval including the second time. From the stored associations between latency measurements and corresponding download data rates, the client device 110 generates a description that correlates latency measurements with download data rates, providing more information about changes in network 120 and communication channel 125 performance over time. Alternatively, the client device 110 transmits the associations between latency measurements and download data rates to the online system 140, which generates and stores correlations between latency measurements and download data rates along with an identifier of the client device 110; this allows the online system 140 to maintain information identifying changes in latency and download data rate to the client device 110 via the network 120 and the communication channel 125.

While FIG. 3 shows an example where the client device 110 receives content from multiple content provider systems 130A, 130B, 130C via the network 120 and the communication channel 125, the client device 110 may similarly generate 340 an upload network data rate by transmitting content to multiple content provider systems 130A, 130B, 130C. To generate 340 the upload network data rate, the client device 110 transmits content to each of multiple content provider systems 130A, 130B, 130C and monitors transmission of content to different content provider systems 130A, 130B, 130C via the network 120 and the communication channel 125. From monitoring transmission of content to each of the different content provider systems 130A, 130B, 130C, the client device 110 generates a metric describing transmission of content from the client device 110 to different content provider systems 130A, 130B, 130C. For example, the client device 110 determines multiple upload data rates for each content provider system 130A, 130B, 130C to which the client device 110 transmits content. In various embodiments, the client device 110 determines an upload data rate identifying a number of bits of content received transmitted from the client device 110 to a content provider system 130a, 130B, 130C received during a time interval for each of multiple time intervals. Subsequently, the client device 110 generates 340 an upload network data rate from the upload data rates using the methods further described above (e.g., determines upload data rates for content transmitted to each content provider system 130A, 130B, 130C over different time intervals, for each content provider system 130A, 130B, 130C sums the upload data rates determined for different time intervals, resulting in a summed upload data rate for each content provider system 130A, 130B, 130C, and applies equation 1 above to the summed upload data rates for each of the content provider systems 130A, 130B, 130C to determine a network upload data rate as a summed upload data rate within a specific percentile of the summed upload data rates or determine a mean, median, or a mode of the upload data rates). The client device 110 may similarly transmit ping requests to each of the multiple content provider systems 130A, 130B, 130C to which the client device transmits content to determine a latency metric for the network 120 and for the communication channel 125 as well as to correlate latency measurements with different upload data rates, as further described above.

Figure 4:
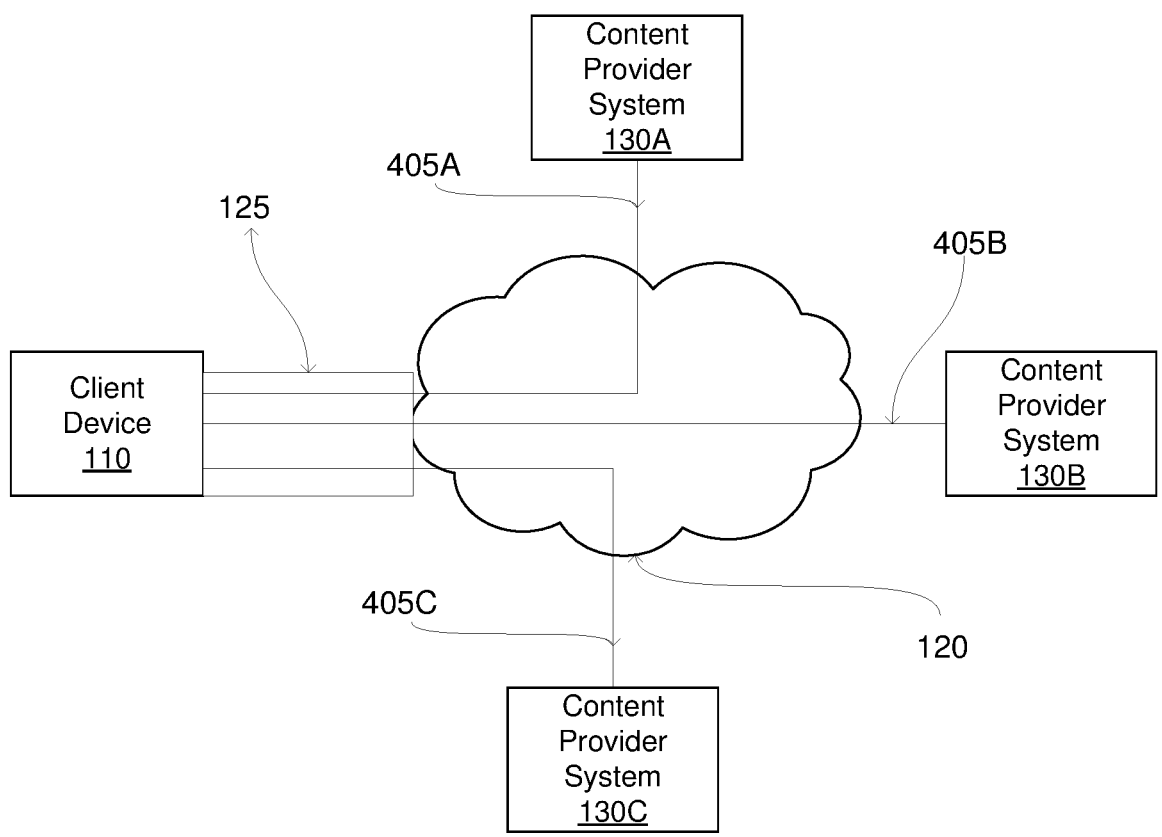
FIG. 4 is a process flow diagram of for generating one or more metrics describing a network to which a client device is coupled, in accordance with an embodiment of the invention.

FIG. 4 is a process flow diagram of one embodiment of a method for evaluating one or more characteristics of a network 120 to which a client device 110 is coupled by exchanging content between the client device 110 and multiple content provider systems 130A, 130B, 130C. As further described above in conjunction with FIG. 1, the client device 110 is coupled to the network 120 via a communication channel 125. To generate one or more metrics describing exchange of content to and from the client device 110 via the network 120 and the communication channel 125, the client device 110 exchanges content with multiple content provider systems 130A, 130B, 130C. To exchange content with different content provider systems 130A, 130B, 130C, the client device 110 establishes a thread 405A, 405B, 405C with each content provider system 130A, 130B, 130C via the network 120 and the communication channel 215. As shown in FIG. 4, the client device 110 exchanges content with content provider system 130A via thread 405A, exchanges content with content provider system 130B via thread 405B, and exchanges content with content provider system 130C via thread 405C.

For example, the client device 110 requests content from multiple different content provider systems 130A, 130B, 130C and monitors rates at which content is received via different threads 405A, 405B, 405C to determine download data rates for receiving content from content provider system 130A, 130B, 130C, respectively. Determining a download data rate for each thread 405A, 405B, 405C during different time intervals allows the client device 110 to determine a download data rate for receiving content from content provider system 130A via thread 405A, from content provider system 130B via thread 405B, and from content provider system 130C via thread 405C. As further described above in conjunction with FIG. 3, the client device 110 generates a network download data rate from the download data rates determined for receiving data from each content provider system 130A, 130B, 130C. Similarly, the client device 110 transmits content to multiple different content provider systems 130A, 130B, 130C and monitors rates at which content is transmitted via different threads 405A, 405B, 405C to determine download data rates for transmitting content to content provider system 130A, 130B, 130C, respectively. By determining an upload data rate for transmitting content to content provider system 130A via thread 405A, to content provider system 130B via thread 405B, and to content provider system 130C via thread 405C, the client device generates a network upload data rate, as further described above in conjunction with FIG. 3.

Generating metrics describing network performance, such as the network download data rate and the network download data rate, by exchanging content via multiple threads 405A, 405B, 405C with different content provider systems 130A, 130B, 130C increases reliability with which the metrics may be provided by preventing a failure of a single content provider system 130A, 130B, 130C or of a single thread 405A, 405B, 405C from preventing calculation of one or more of the metrics. Additionally, leveraging exchange of content between the client device 110 and multiple content provider systems 130A, 130B, 130C prevents configuration or operation of a single content provider system 130A, 130B, 130C from skewing or from disproportionately affecting the generated metrics. Further, using exchange of data between the client device 110 and different content provider systems 130A, 130B, 130C to generate metrics describing network performance allows the generated metrics to more accurately reflect typical network usage conditions.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   transmitting a request for content from a client device in parallel to each of a plurality of different content provider systems that are each coupled to the client device via a network and a communication channel, different content requested from different content provider systems;
   receiving the content from each of the different content provider systems at the client device, content from different content provider systems received by the client device via different threads established via the network and the communication channel;
   generating, at the client device, a metric for each of the plurality of different content provider systems describing receipt of content from each of the plurality of different content provider systems at the client device during one or more time intervals; and
   generating, at the client device, a network metric that describes transmission of content from each of the plurality of different content provider systems to the client device via the network and the one or more threads established via the network and the communication channel from the generated metrics by:
      generating, at the client device, a plurality of download data rates for each of the different content provider systems, each of the plurality of download data rates correlated with a time interval during which a download data rate was generated;
      for each content provider system, summing download data rates generated for the content provider system during different time intervals, generating a summed download data rate for each content provider system; and
      determining a network download data rate as a summed download data rate within a specific percentile of the summed download data rates.

2. The method of claim 1, wherein different content provider systems have different geographic locations.

3. The method of claim 2, wherein a content provider system has a specific geographic location.

4. The method of claim 1, wherein generating, at the client device, the metric for each of the plurality of different content provider systems describing receipt of content from each of the plurality of different content provider systems at the client device during the time interval further comprises:
   determining multiple latency measurements for each of the content provider systems while the client device is receiving content from each of the content provider systems.

5. The method of claim 4, wherein generating, at the client device, the network metric that describes transmission of content from each of the plurality of different content provider systems to the client device via the network and the one or more threads established via the network and the communication channel from the generated metrics further comprises:
   storing correlations between latency measurements determined at different times for each content provider system and download data rates determined for different content provider systems during different time intervals, a latency measurement for a content provider system determined at a time correlated with a download data rate generated for the content provider system for a time interval including the time.

6. The method of claim 1, wherein generating, at the client device, the network metric that describes transmission of content from each of the plurality of different content provider systems to the client device via the network and the one or more threads established via the network and the communication channel from the generated metrics further comprises:
   generating a network download data rate as a mean of the plurality of download data rates for each of the different content provider systems.

7. The method of claim 1, wherein generating, at the client device, the network metric that describes transmission of content from each of the plurality of different content provider systems to the client device via the network and the one or more threads established via the network and the communication channel from the generated metrics comprises
   generating a network download data rate as a median of the plurality of download data rates for each of the different content provider systems.

8. The method of claim 1 further comprising:
   transmitting content from the client device in parallel to each of the plurality of different content provider systems that are each coupled to the client device via the network and the communication channel;
   generating, at the client device, a plurality of upload data rates for each of the different content provider systems based on amounts of content transmitted to different content provider systems from the client device, each of the plurality of download data rates correlated with a time interval during which an upload data rate was generated;

for each content provider system, summing upload data rates generated for the content provider system during different time intervals, generating a summed upload data rate for each content provider system; and determining a network upload data rate as a summed download data rate within a specific percentile of the summed upload data rates.

9. A computer program product comprising a non-transitory computer readable storage medium having instructions encoded thereon that, when executed by a processor, cause the processor to:

transmit a request for content from a client device in parallel to each of a plurality of different content provider systems that are each coupled to the client device via a network and a communication channel, different content requested from different content provider systems;

receive the content from each of the different content provider systems at the client device, content from different content provider systems received by the client device via different threads established via the network and the communication channel;

generate, at the client device, a metric for each of the plurality of different content provider systems describing receipt of content from each of the plurality of different content provider systems at the client device during one or more time intervals; and generate, at the client device, a network metric that describes transmission of content from each of the plurality of different content provider systems to the client device via the network and the one or more threads established via the network and the communication channel from the generated metrics by:

generating, at the client device, a plurality of download data rates for each of the different content provider systems, each of the plurality of download data rates correlated with a time interval during which a download data rate was generated;

for each content provider system, summing download data rates generated for the content provider system during different time intervals, generating a summed download data rate for each content provider system; and determining a network download data rate as a summed download data rate within a specific percentile of the summed download data rates.

10. The computer program product of claim 9, wherein different content provider systems have different geographic locations.

11. The computer program product of claim 10, wherein a content provider system has a specific geographic location.

12. The computer program product of claim 9, wherein generate, at the client device, the metric for each of the plurality of different content provider systems describing receipt of content from each of the plurality of different content provider systems at the client device during the time interval further comprises:

determine multiple latency measurements for each of the content provider systems while the client device is receiving content from each of the content provider systems.

13. The computer program product of claim 12, wherein generate, at the client device, the network metric that describes transmission of content from each of the plurality of different content provider systems to the client device via the network and the one or more threads established via the network and the communication channel from the generated metrics further comprises:

store correlations between latency measurements determined at different times for each content provider system and download data rates determined for different content provider systems during different time intervals, a latency measurement for a content provider system determined at a time correlated with a download data rate generated for the content provider system for a time interval including the time.

14. The computer program product of claim 9, wherein generate, at the client device, the network metric that describes transmission of content from each of the plurality of different content provider systems to the client device via the network and the one or more threads established via the network and the communication channel from the generated metrics further comprises generate a network download data rate as a mean of the plurality of download data rates for each of the different content provider systems.

15. The computer program product of claim 9, wherein generate, at the client device, the network metric that describes transmission of content from each of the plurality of different content provider systems to the client device via the network and the one or more threads established via the network and the communication channel from the generated metrics further comprises:

generate a network download data rate as a median of the plurality of download data rates for each of the different content provider systems.

16. The computer program product of claim 9, wherein the non-transitory computer readable storage medium further has instructions encoded thereon that, when executed by the processor, cause the processor to:

transmit content from the client device in parallel to each of the plurality of different content provider systems that are each coupled to the client device via the network and the communication channel;

generate, at the client device, a plurality of upload data rates for each of the different content provider systems based on amounts of content transmitted to different content provider systems from the client device, each of the plurality of download data rates correlated with a time interval during which an upload data rate was generated;

for each content provider system, sum upload data rates generated for the content provider system during different time intervals, generating a summed upload data rate for each content provider system; and determine a network upload data rate as a summed download data rate within a specific percentile of the summed upload data rates.

* * * * *